United States Patent [19]

Kennedy et al.

[11] Patent Number: 5,317,323
[45] Date of Patent: May 31, 1994

[54] PASSIVE HIGH ACCURACY GEOLOCATION SYSTEM AND METHOD

[75] Inventors: Joseph P. Kennedy, Fairfax; Christopher D. Roller, Burke; Robert W. Hooper, Arlington; all of Va.

[73] Assignee: E-Systems, Inc., Dallas, Tex.

[21] Appl. No.: 26,782

[22] Filed: Mar. 5, 1993

[51] Int. Cl.⁵ .................................................. G01S 3/02
[52] U.S. Cl. ...................... 342/457; 342/357; 342/465
[58] Field of Search ............ 342/357, 457, 387, 389, 342/465

[56] References Cited

U.S. PATENT DOCUMENTS

| | | | |
|---|---|---|---|
| 3,996,590 | 12/1976 | Hammack. | |
| 4,494,119 | 1/1985 | Wimbush | 342/457 |
| 4,740,792 | 4/1988 | Sagey et al. | 342/457 |
| 4,742,357 | 5/1988 | Rackley | 342/457 |
| 4,791,572 | 12/1988 | Green, III et al. | 342/457 |
| 4,797,679 | 1/1989 | Cusdin et al. | 342/387 |
| 4,884,208 | 11/1989 | Marinelli et al. | 342/351 |
| 4,888,593 | 12/1989 | Friedman et al. | 342/387 |
| 4,916,455 | 4/1990 | Bent et al. | 342/457 |
| 5,008,679 | 4/1991 | Effland et al. | 342/353 |

*Primary Examiner*—Theodore M. Blum
*Attorney, Agent, or Firm*—Rogers & Killeen

[57] ABSTRACT

A system for accurately locating a mobile cellular radio includes plural radio receivers, the position of each being precisely known, a satellite-based time source for providing the actual time of arrival of a radio signal at the plural radio receivers, and a device for removing multipath and cochannel interference from the received signals so that actual time of arrival of the radio signal may be determined accurately. The Global Positioning System (GPS) may be used to provide the time signal and to provide the precise location of the plural radio receivers. The system may be used to passively determine the location of the mobile radio and is accurate enough to use with a computer generated map system.

31 Claims, 6 Drawing Sheets

PASSIVE HIGH ACCURACY GEOLOCATION SYSTEM AND METHOD

BACKGROUND OF THE INVENTION

The present invention relates to methods and systems for locating the source of a radio frequency (RF) transmission, and more particularly to a method and system for accurately locating a mobile cellular radio through the novel use of a grid of radio receivers and the Global Positioning System (GPS).

Cellular mobile radio systems are well known. Such systems use a plurality of base stations for broadcasting paging signals to and for maintaining voice communications with mobile radio equipped units. Such mobile radios may include automobile carried cellular mobile telephones, portable cellular telephones, pagers, dispatch and/or data link radios, and a variety of other RF broadcasting equipment that may be mobile and for which a position may be sought. Most such radios are individually identified by a code or call number. Once turned on, each radio transmits an identifying signal that includes the code so that the radio may be contacted if a call is directed to it. That is, the user of the radio does not have to be actively engaged in a conversation on the radio for a signal from the radio to be received by the base stations.

Frequently, it is desirable that the position of the mobile radio be determined quickly and without the knowledge of the mobile radio's possessor. For example, police may benefit from the knowledge of the position of a mobile radio that may be carried by a suspect (e.g., drug dealer) or by knowing the position of a stolen automobile carrying a mobile radio.

Various systems for determining the position of mobile radios exist in the prior art. However, such systems are not accurate enough for the needs of all potential users. For example, in law enforcement applications it is desirable that the location of the mobile radio be known within 100 meters (less than a city block) so that police may be dispatched efficiently and so that the movement of the radio may be tracked on an appropriate map display.

The accuracy of prior art systems is degraded for various reasons, including the fact that many cellular radio signals are of very short duration, sometimes a second or less. Prior art systems require more time than this to integrate the signal so that an accurate location may be determined.

This problem is exacerbated in the presence of multipath interference for which prior art systems need even longer integration times. Prior art systems use techniques for obviating multipath in which multiple samples are integrated over time, assuming the specular receipts will not be stationary and will have a zero mean over the sample size. As is known, this assumption may be false, depending on geographical conditions and integration time.

A further disadvantage of the prior art is that many of the systems are not passive. That is, some action by the user of the mobile radio may be needed to initiate or maintain tracking by a base unit. For example, the user may have to initiate a special signal that may be detected and tracked. It is desirable that locating systems available to law enforcement not rely on action by a mobile radio user.

Accordingly, it is an object of the present invention to provide a novel method and system for determining the position of a mobile radio that obviates the problems of the prior art.

It is a further object of the present invention to provide a novel method and system for accurately locating a mobile cellular radio that uses an accurate time source to determine the actual time of arrival of a radio signal and to accurately determine the position of a grid of radio receivers.

It is another object of the present invention to provide a novel method and system for accurately locating a mobile cellular radio in which the received radio signals are stripped of interfering multipath and cochannel signals so as to provide a more accurate time of arrival of the received signal.

It is yet another object of the present invention to provide a novel method and system of accurately locating a mobile cellular radio that uses the Global Positioning System to provide an accurate time of receipt of a radio signal from a mobile radio from which the multipath signals have been removed.

It is still another object of the present invention to provide a novel method and system of accurately locating a mobile cellular radio in which a positional accuracy of one hundred meters or less may be achieved with signals having a duration of a second or less.

It is yet a further object of the present invention to provide a novel method and system of accurately locating a mobile cellular radio in which deleterious multipath effects are mitigated without long integration times and without assuming that multipath has a zero mean over the sample size.

These and many other objects and advantages of the present invention will be readily apparent to one skilled in the art to which the invention pertains from a perusal of the claims, the appended drawings, and the following detailed description of preferred embodiments. dr

DESCRIPTION OF PREFERRED EMBODIMENTS

Figure 1:
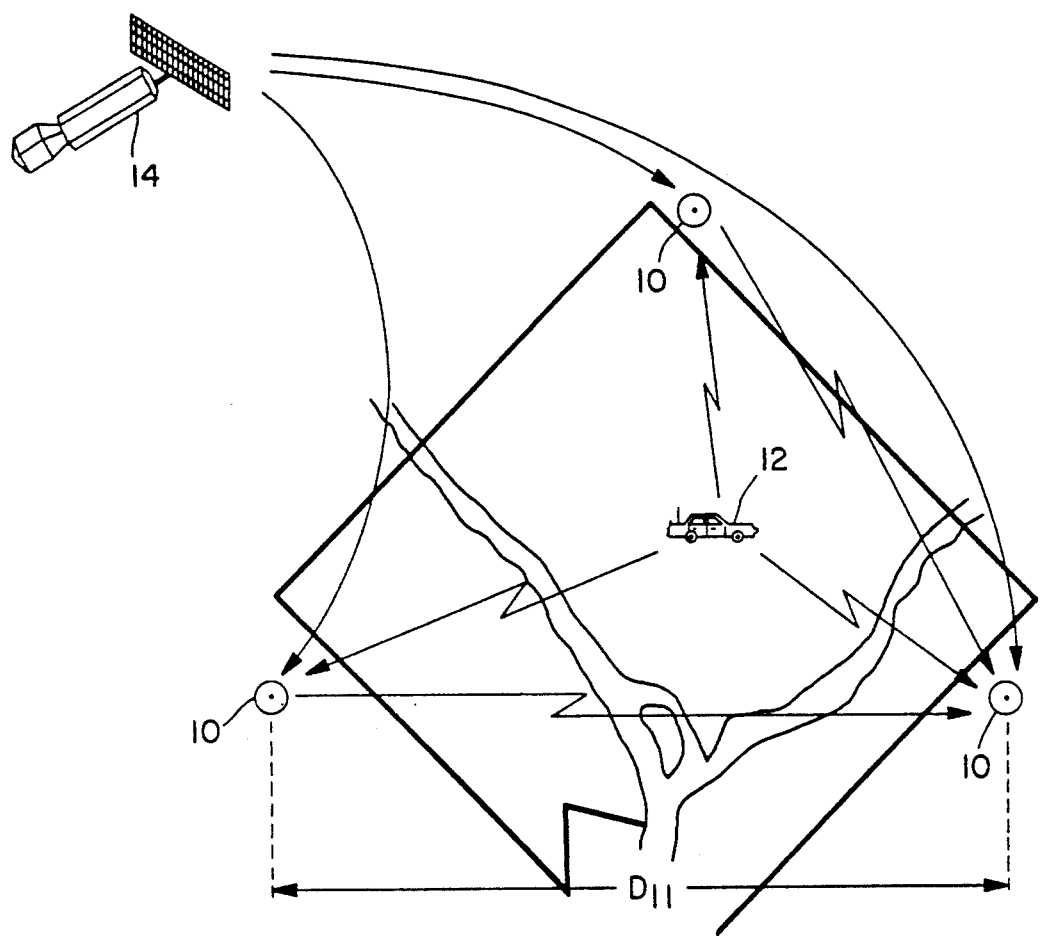
FIG. 1 is a pictorial representation of a grid of radio receivers illustrating an application of the present invention.

With reference now to FIG. 1, the present invention may find application in a mobile cellular radio receiving grid having three or more radio receivers 10 spaced so that a signal from a mobile radio 12 in the area of coverage of the grid will be received by at least three of the radio receivers 10. When the radio signal from the mobile radio 12 is received by three or more of the radio receivers 10, the position of the mobile radio 12 may be determined using time difference of arrival (TDOA) algorithms. In such algorithms a generalized cross-correlation technique is used to calculate TDOA between pairs of receivers. A cross-spectrum of receiver pair data is formed and weighted with a maximum likelihood window. An inverse transform is calculated, with the TDOA between pairs being the peak of the generalized cross-correlation. The position of the mobile radio is thus determined to be located at the intersection of the constant TDOA hyperbolas for each pair of receivers.

At least two pieces of information are required to determine the location of a mobile radio using TDOA. First, the time of arrival of a radio signal from the mobile radio must be known at two of the radio receivers relative to the arrival time at a third one of the receivers. Second, the location of the radio receivers must be known. The accuracy of the determined position depends on the accuracy of these two pieces of information.

Figure 2:
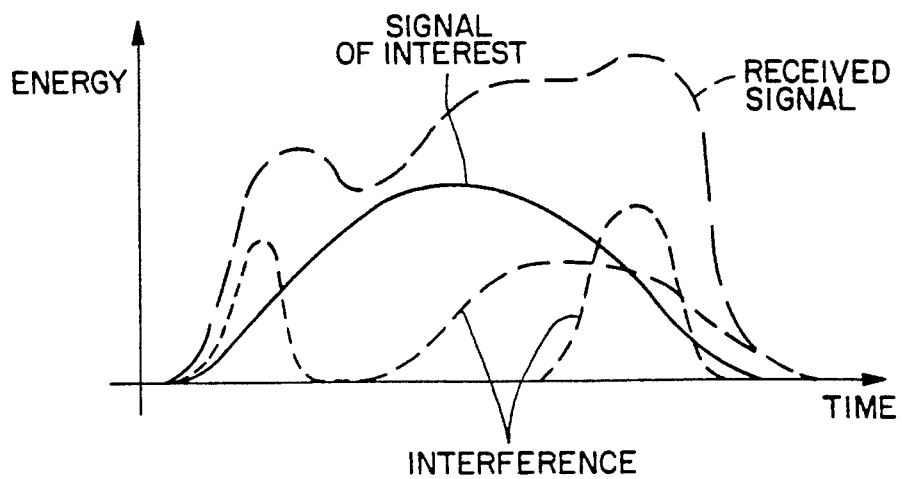
FIG. 2 is a graphical depiction of the effect of multipath and cochannel interference on the arrival time of a radio signal.

The arrival time of a radio signal, such as the identifying signal sent by a mobile cellular telephone, may be determined by finding the time of arrival of an energy peak. As seen in FIG. 2, a radio signal arrival time may be approximated by a Gaussian distribution. If only the signal of interest arrives, the time of arrival is easily determined. However, the problem of accurately determining the arrival time is exacerbated by the presence of multipath and cochannel interference. Multipath interference is caused by reflections of the radio signal arriving at the receiver. Multipath interference is especially prevalent in urban areas and in other areas where there is a multiplicity of potential reflectors. Cochannel interference is caused by other radio signals on the same or nearby frequencies and is usually less of a problem than multipath.

As seen in FIG. 2, the actual arrival time of the signal of interest may be masked by multipath and cochannel interference so that the apparent arrival time of the received signal may be earlier or later than the actual arrival time, potentially reducing the accuracy of the TDOA determined mobile radio position by several orders of magnitude.

While the position of each of the receivers may be determined simply enough by known methods, the accurate determination of such position, including the precise position in three dimensions (i.e., elevation, latitude and longitude) is more troublesome and may require time consuming and costly surveys.

In the method and system of the present invention, time and position accuracies are improved over that of the prior art so that the location of the mobile radio may be determined using TDOA to within 100 meters or less. As will be explained below, the time of arrival of a radio signal at each of the radio receivers may be determined to within about 100 nanoseconds and the position of the radio receivers to within about four meters to achieve the 100 meter accuracy. The radio signal may have a duration of a second or less without degradation of positional accuracy.

With further reference to FIG. 1, the method and system of the present invention may include a satellite-based time source 14 for providing an accurate time signal to the receivers. The time signal is used to determine the actual time of arrival of a signal at each of the receivers. The actual times may be used to determine the relative arrival times for the TDOA calculations. The time source 14 may also be used to determine the precise positions of the radio receivers using techniques known in the art. Known satellite-based systems, such as the Global Positioning System (GPS), are able to provide timing references that have less than about 100 nanoseconds clock error and provide receiver positional accuracies of about 4 meters or less. These positional accuracies are achievable using a differential GPS scheme in which corrections to satellite derived positions are made based on a single site known position and a calculated position based on GPS pseudo-ranging. Without differential GPS, positional accuracy may be less. For example, using commercial GPS codes, the accuracy may be 40 meters circular error probable (CEP) or 76 meters spherical error probable (SEP).

The grid of radio receivers 10 in the present invention may include master receivers and slave receivers. The master and slave receivers may be arranged so that the three radio receivers receiving a radio signal include at least one master and two slaves. The distance D between the receivers depends on the desired accuracy, with distances between 10 and 15 kilometers being sufficient to provide approximately 100 meter positional accuracy with three receivers having antennae of nominal height. Receivers with taller antennae may be spaced farther apart. Four or more receivers may be able to provide a similar accuracy when spaced farther apart (or better accuracy when spaced 10 to 15 kilometers apart). Location accuracy will degrade as the mobile radio moves outside the grid of receivers.

Figure 3:
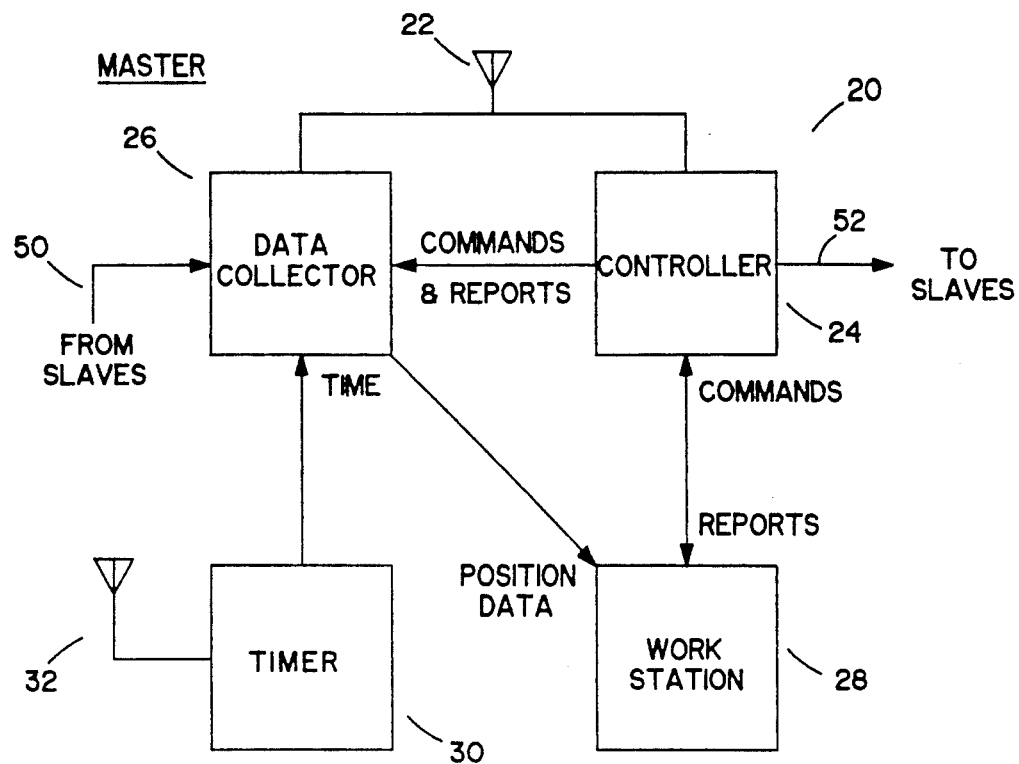
FIG. 3 is a block diagram of a master receiver of the present invention.

With reference now to FIG. 3, a master receiver 20 may include an array of antenna elements 22 providing omnidirectional coverage for receiving radio signals from a mobile radio and having the ability to steer spatial gain beams and nulls, a controller 24 having a multichannel receiver therein for receiving the radio signal from the mobile radio on control channels and voice channels, a high performance phase equalized receiver 26 to collect the signal data for interference/multipath identification and mitigation and for the subsequent TDOA calculations, a user interface workstation 28 for providing commands to the controller 24 and for receiving reports from the controller 24 and position data from the data collector 26, and a timer 30 for providing an accurate time of day to the data collector 26 for subsequent use in the TDOA calculations. The timer 30 receives inputs from a satellite-based system via satellite antenna 32.

The controller 24 monitors the control channels of the mobile radio so that the particular mobile radio of interest may be located and/or tracked using its identification code or call number. The voice channels are monitored so that frequency changes and the identity of receivers 10 receiving the radio signal may be followed. The controller 24 is thereby able to follow the mobile radio of interest from receiver to receiver and from frequency to frequency as it moves through the coverage area of a grid of receivers and as its frequency is shifted by a central control station for the mobile radio grid as is known in the art. The controller 24 provides commands to the data collector 26 so that it is able to collect time of arrival of a particular radio signal from the mobile radio of interest. The workstation 28 may include appropriate user interface equipment, such as display screen, keyboard, mouse, and/or screen interface systems. The timer 30 receives and process the satellite-based timing information and provides a high precision clock, such as a rubidium or cesium clock, for oscillator locking and analog to digital (A/D) conversion clocks.

Figure 4:
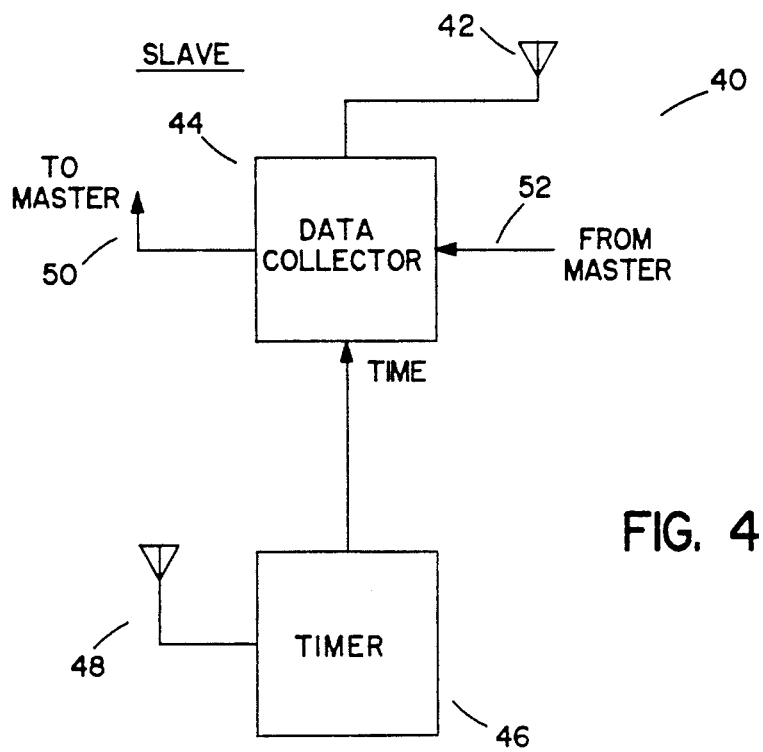
FIG. 4 is a block diagram of a slave receiver of the present invention.

With reference now to FIG. 4, the slave receiver 40 may also include an antenna 42, data collector 44, timer 46 and satellite antenna 48. These components may be identical to those in the master receiver. Each slave receiver 40 may also include equipment so that it may be a master receiver if needed. Data from each slave data collector 44 is provided to the master data collector 26 through an appropriate communication link 50, such as modem or RF link. The slave data collectors 44 receive data collection instructions from the master controller 24 via appropriate link 52.

Figure 5:
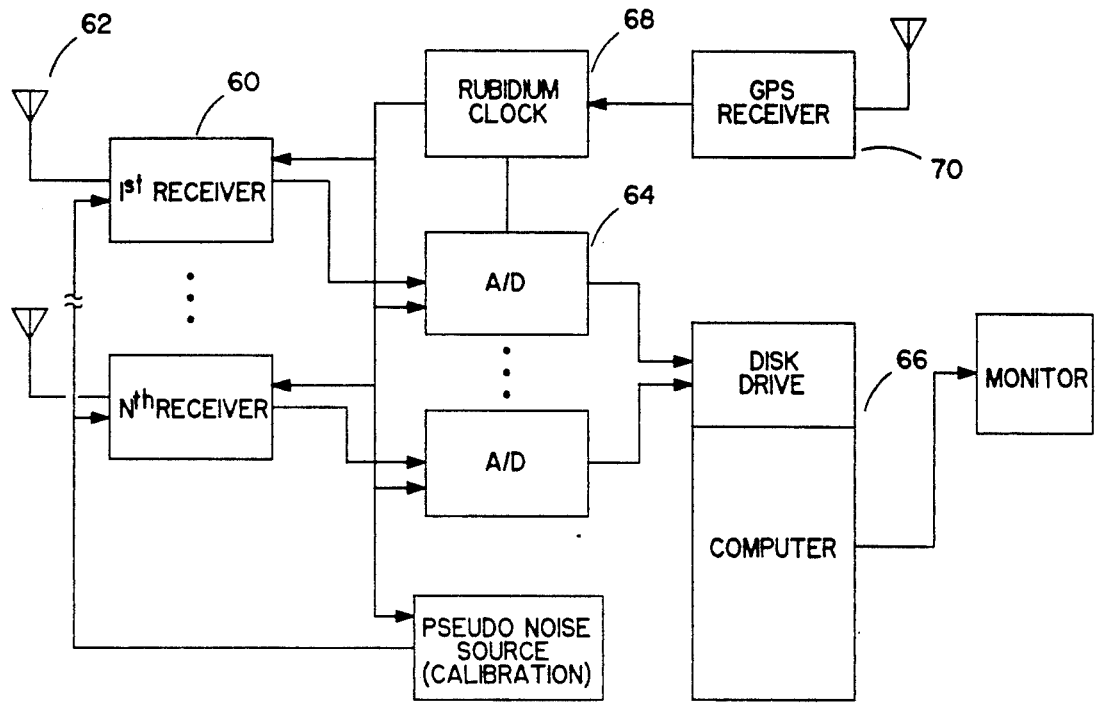
FIG. 5 is a block diagram illustrating the components that may be found in an embodiment of the master receiver of the present invention.

An embodiment of a master receiver of the present invention may be seen in FIG. 5. As illustrated therein, the incoming RF waveform from the mobile radio is received by receivers 60 through antennae 62. The collected data is digitized in A/D converters 64 and provided to a computer 66 for equalization to compensate for the effects of the receiver channels. A rubidium clock 68 provides internal timing. The clock 68 is calibrated using a satellite-based time source, such as GPS, available through a receiver 70. In computer 66 multipath and cochannel interference are removed to isolate the signal of interest. The digitized samples corresponding to the signal of interest are then used in the TDOA calculation and mobile radio location calculation.

As discussed above, the present invention strips multipath interference from the received signal so that the actual time of arrival of the signal of interest may be determined. Multipath interference in a cellular radio environment has two characteristics which can be used to differentiate it from the signal of interest: angle of arrival and time of arrival.

Figure 6:
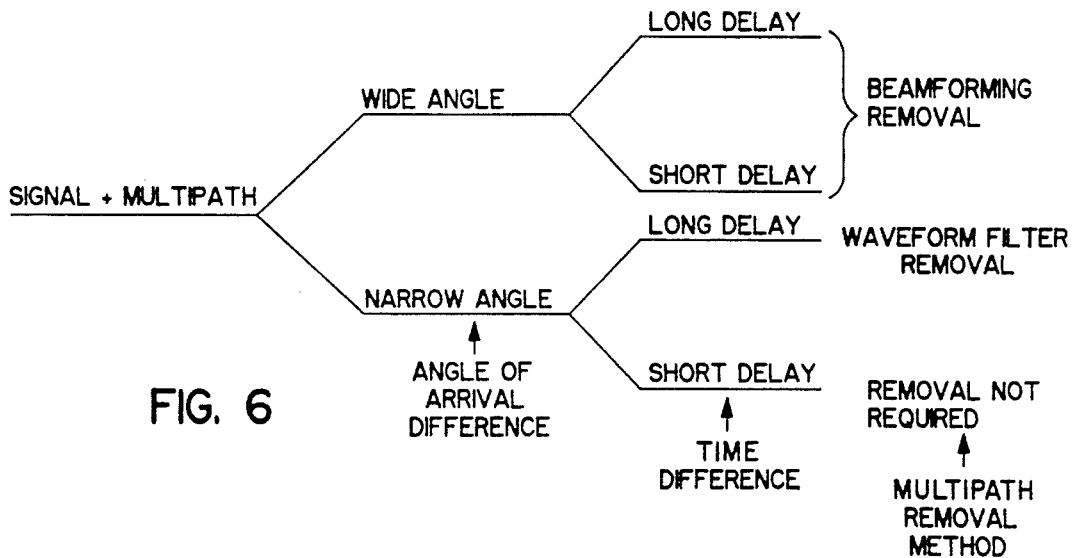
FIG. 6 is a chart of the various multipath components.

With reference to FIG. 6, multipath interference may be analyzed by first considering angle of arrival and then time of arrival. Multipath components whose angle of arrival relative to the signal of interest that may be detected by super-resolution direction finding and removed by spatial beamforming may be considered wide angle. These components can be removed regardless of their time delay relative to the direct signal. It is known that a large percentage of the multipath components in urban environments are wide angle. Multipath components whose angle of arrival is too narrow to remove by such methods, may either have a long delay (defined to be long enough to degrade positional accuracy beyond the desired 100 meters) or a short delay (e.g., less than about 1.0° and desirably less than about 0.5°). Long delay, narrow angle, multipath components may be removed by using known cross correlation waveform filtering techniques. Short delay, narrow angle, multipath components need not be removed as they do not degrade the accuracy of the received signal below the desired amount.

The preferred method of removing the wide angle multipath components is to use super-re-solution direction finding algorithms to compute the direction of arrival of the signal of interest and the multipath components. The signal received first (and usually the strongest) is assumed to be the signal of interest and the other components are assumed to be interferers. Once the components are identified using the super-resolution direction finding techniques, the interferers are attenuated through beamforming and/or spatial nulling techniques.

Figure 7:
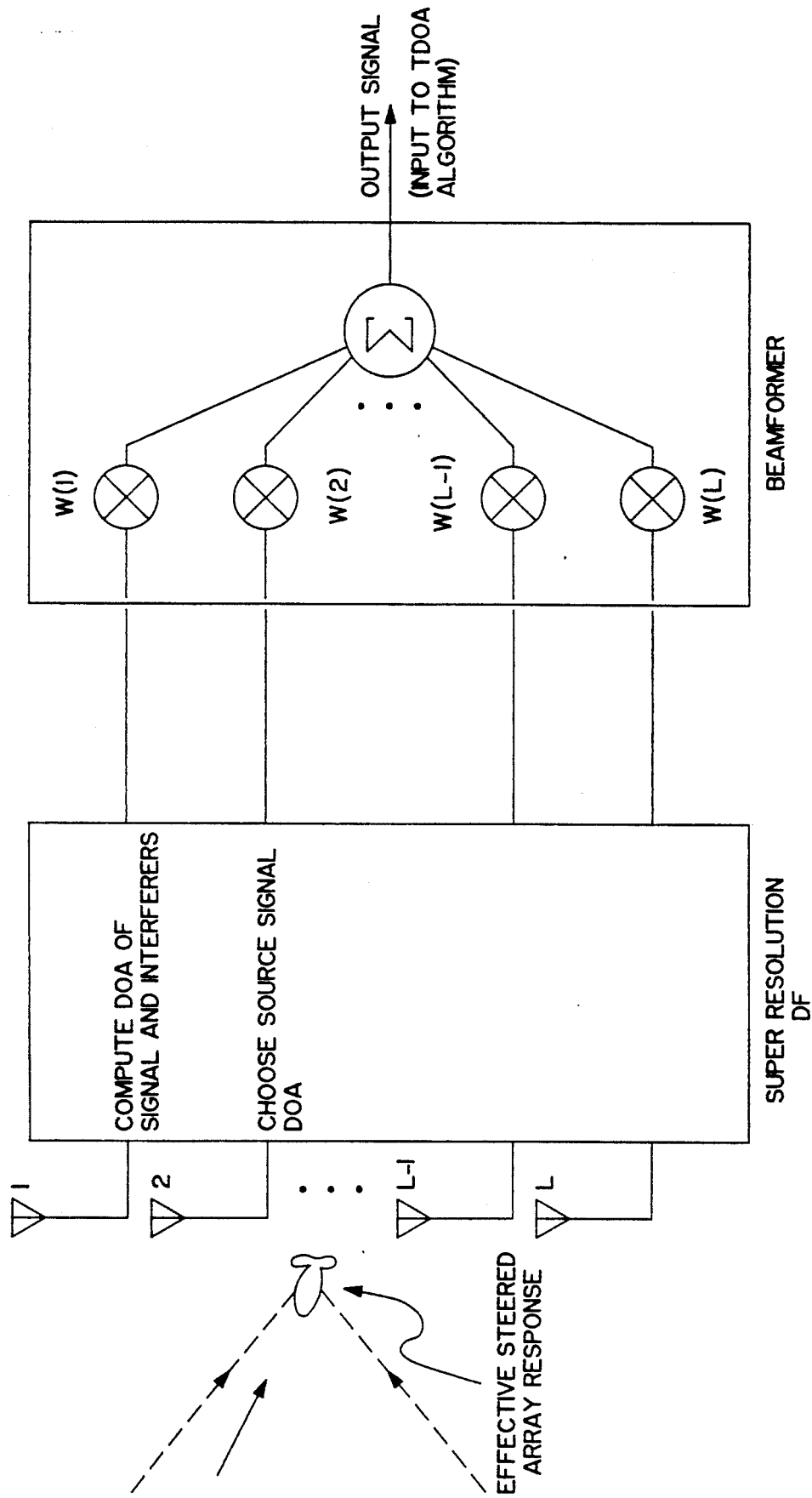
FIG. 7 is a block diagram of a multipath reduction technique of the present invention.

For example, with reference to FIG. 7, a signal received at antennae 1 through L is processed using super-resolution direction finding. The directions of arrival (DOA) of the components of the received signal are determined and signal of interest is selected. The multipath components are stripped by multiplying the resolved signals by a weight vector W, where:

$$W = [I - V_I(V_I^H V_I^{-1})(V_I^H)] \cdot V_S \quad (1)$$

and $V_I$ is an array of interferer mode vectors, and $V_S$ is a source mode vector. The weighted components are summed for use in subsequent TDOA calculations. In effect, the effective response of the antennae array is steered in the direction of the signal of interest. Other techniques for determining W are known in the art and may be acceptable for use herein.

The removal of multipath may be further improved by feeding back positional information to the super-resolution direction finder, and/or by trend fitting of correlation peaks over time. These may eliminate bias in the cross-correlation domain, thereby improving the recognition of the signal of interest and the accuracy of the determined time of arrival.

Figure 8:
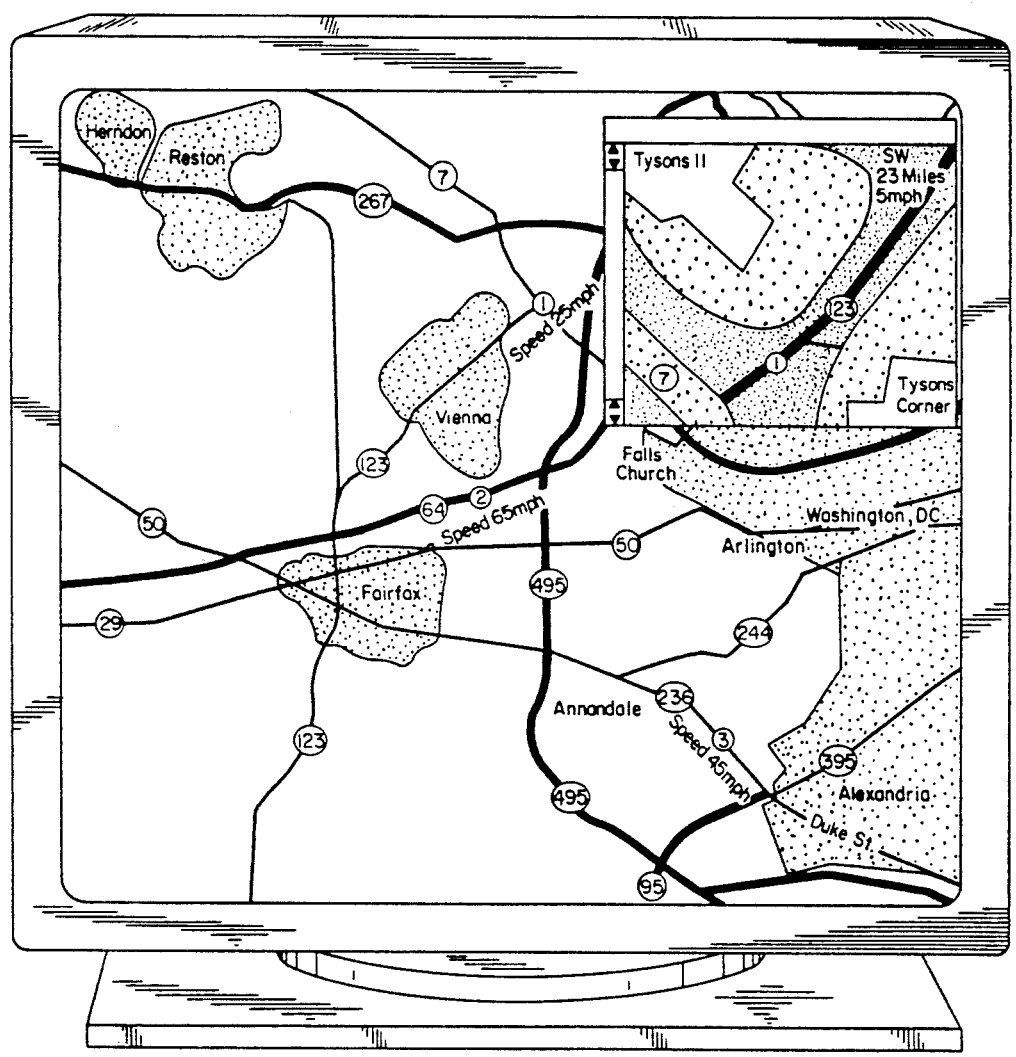
FIG. 8 is a pictorial depiction of a monitor illustrating a computer generated map including mobile radio positions generated by the present invention.

With reference to FIG. 8, the workstation 28 may use available technology to incorporate the position provided by the present invention into a computer generated map. Further, the speed and direction of movement of the mobile radio may be determined and displayed on the screen.

Figure 9:
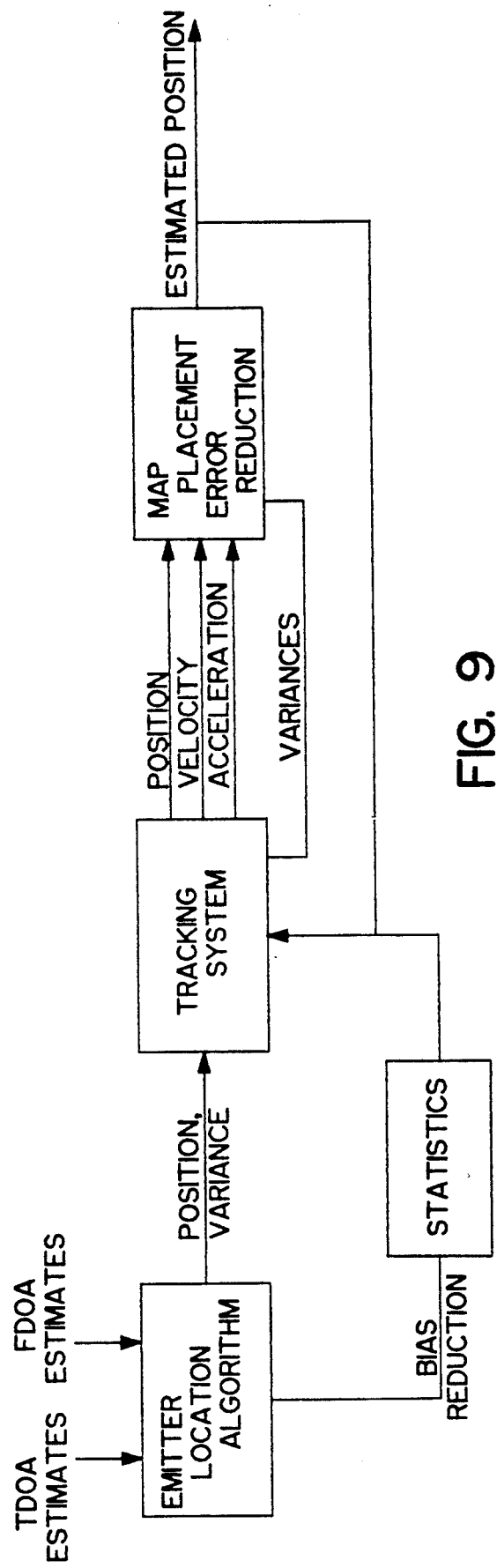
FIG. 9 is a block diagram of an error reduction method of the present invention.

The map and placement of the position of the mobile radio on the map may be used to further improve the accuracy of the determined location. For example, with reference to FIG. 9, a tracking system may provide information for the generation of bias reduction statistics that may be used by the location determining algorithm to reduce system error. The tracking system may also be used to provide the mobile radio's speed, direction, acceleration and/or estimated position. The estimated position may be used in the direction finder as discussed above to improve multipath elimination.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A system for accurately locating a mobile cellular radio comprising:

a grid of at least three radio receivers for receiving a radio signal from the mobile cellular radio, the position of said radio receivers being known to within about four meters;

resolution means for removing multipath radio signals from the radio signal received by said radio receivers using angle-of-arrival differentiation;

a satellite-based time source for providing the actual time of arrival of the radio signal from the mobile cellular radio at said radio receivers to an accuracy of less than about one hundred nanoseconds; and calculating means for determining the location of the mobile cellular radio based on the time difference of arrival of the radio signal received therefrom at said radio receivers, said calculating means being operatively connected to said radio receivers so as to receive therefrom the actual time of arrival of the radio signal from the mobile cellular radio.

2. The system of claim 1 wherein said satellite-based time source is a Global Positioning System (GPS) satellite.

3. The system of claim 2 further comprising means for determining the position of said radio receivers using the GPS.

4. The system of claim 1 wherein said grid includes at least one master receiver and at least two slave receivers at the corners of a triangular area wherein the mobile cellular radio may be located.

5. The system of claim 4 wherein said master receiver is separated from said slave receivers by about ten to fifteen kilometers.

6. The system of claim 4 wherein said resolution means and said calculating means are collocated with said master receiver.

7. The system of claim 1 further comprising a display for indicating the location of the mobile cellular radio on a computer generated map.

8. The system of claim 1 wherein said calculating means is connected to said radio receivers through a modem.

9. The system of claim 1 further comprising means for determining the speed and direction of movement of the mobile cellular radio.

10. The system of claim 1 wherein said resolution means includes means for using super-resolution direction finding techniques.

11. The system of claim 10 wherein said resolution means includes means for time discrimination between multipath signals that are not separated from the received radio signal by a sufficient angle for differentiation by super-resolution direction finding techniques.

12. A system for locating a mobile cellular radio broadcasting a radio signal received by a grid of at least three radio receivers, the system comprising:
   resolution means for removing multipath radio signals from the radio signal received by said radio receivers;
   a satellite-based time source for providing the actual time of arrival of the radio signal from the mobile cellular radio at said radio receivers; and
   calculating means for determining the location of the mobile cellular radio based on the time difference of arrival of the radio signal received therefrom at said radio receivers.

13. The system of claim 12 further comprising positioning means for determining the position of the radio receivers to within about four meters, said positioning means including said satellite-based time source.

14. The system of claim 13 wherein said positioning means is the GPS.

15. The system of claim 14 wherein said satellite-based time source provides the actual time of arrival of the radio signal from the mobile cellular radio at said radio receivers to an accuracy of less than about one hundred nanoseconds.

16. The system of claim 15 wherein said resolution means includes means for using super-resolution direction finding techniques.

17. The system of claim 16 wherein said resolution means includes means for time discrimination between multipath signals that are not separated from the received radio signal by a sufficient angle for differentiation by super-resolution direction finding techniques.

18. A system for accurately locating a mobile cellular telephone that is broadcasting an identification signal, the system comprising:
   a grid of at least three radio receivers for receiving a signal including the identification signal from the mobile cellular telephone, each of said receivers having an antenna, the position of which is known in three dimensions to within four meters;
   controller means for providing the frequency of the identification signal to said receivers;
   resolution means for determining the angle of arrival of the identification signal and of multipath interference;
   beamforming means for removing multipath interference from the received signal when the angle of arrival of the multipath interference is more than about 1° from the angle of arrival of the identification signal;
   a satellite antenna at each of said receivers for receiving GPS signals including time of day that is accurate to within one hundred nanoseconds and information for determining the position of said radio receiver antenna to within about four meters;
   positioning means for determining the location of each said radio receiver antenna;
   calculating means for determining the location of the mobile cellular telephone based on the time difference of arrival of the identification signal at said radio receiver antennae, the time difference of arrival being determined based on the GPS time of day signal and the location of each said radio receiver antenna determined by said positioning means; and
   display means for showing the determined location of the mobile cellular telephone on a computer generated map.

19. The system of claim 18 further comprising feedback means for providing the determined position of the mobile cellular telephone to said resolution means.

20. A method of determining the location of a mobile cellular radio comprising the steps of:
   a. determining to within about four meters the position of radio receivers in a grid of radio receivers for receiving a radio signal from the mobile cellular radio, the grid including at least one master receiver and at least two slave receivers at the corners of a triangular area wherein the mobile cellular radio may be located;
   b. receiving a radio signal from the mobile cellular radio at said ones of said radio receivers at the corners of one said triangular area;
   c. nulling multipath radio signals from the received radio signal using angle-of-arrival differentiation;
   d. providing from a satellite-based time source the actual time of arrival of the received radio signal at said radio receivers to an accuracy of less than about one hundred nanoseconds; and
   e. determining the location of the mobile cellular radio based on the time difference of arrival of the radio signal received therefrom at said ones of said radio receivers at the corners of one said triangular area.

21. The method of claim 20 wherein said satellite-based time source is a GPS satellite.

22. The method of claim 21 wherein the step of determining the position of said radio receivers uses the GPS.

23. The method of claim 20 wherein said master receiver is separated from said slave receivers by about ten to fifteen kilometers.

24. The method of claim 20 further comprising the step of displaying the location of the mobile cellular radio on a map.

25. The method of claim 20 further comprising the step of determining the direction of movement of the mobile cellular radio.

26. The method of claim 20 wherein the step of nulling multipath radio signals uses super-resolution direction finding techniques.

27. The method of claim 26 wherein the step of nulling multipath radio signals further includes the step of using time discrimination between multipath signals to remove multipath radio signals that are not separated from the received radio signal by a sufficient angle for differentiation by super-resolution direction finding techniques.

28. A method of determining the location of a mobile cellular radio with a triangular grid of radio receivers that receive a radio signal from the mobile cellular radio, the method comprising the steps of:
   a. removing the multipath signals from the radio signal received at said radio receivers;
   b. providing from a satellite-based time source the actual times of arrival at said radio receivers of the radio signal from the mobile cellular radio; and
   c. determining the location of the mobile cellular radio based on the time difference of arrival of the radio signal from the mobile cellular radio at said radio receivers using the actual times of arrival.

29. A method of determining the location of a mobile cellular radio to within about 100 meters when the mobile cellular radio transmits a radio signal of a second or less duration, the method comprising the steps of:
   a. establishing a grid of radio receivers for receiving a radio signal from the mobile cellular radio, the grid including at least one master receiver and at least two slave receivers at the corners of a triangular area wherein the mobile cellular radio may be located, said two slave receivers being spaced about ten to fifteen kilometers from said master receiver;
   b. determining the position of said radio receivers to within about four meters using the GPS;
   c. receiving a radio signal from the mobile cellular radio at said ones of said radio receivers at the corners of one said triangular area;
   d. removing multipath radio signals from the received radio signal using (1) super-resolution direction finding techniques, and (2) time discrimination between multipath signals that are not separated from the received radio signal by a sufficient angle for differentiation by super-resolution direction finding techniques;
   e. providing from the GPS the actual time of arrival of the received radio signal at said radio receivers to an accuracy of less than about one hundred nanoseconds; and
   f. determining the location of the mobile cellular radio based on the time difference of arrival of the radio signal received therefrom at said ones of said radio receivers at the corners of one said triangular area.

30. The method of claim 29 further comprising the step of displaying the location of the mobile cellular radio on a computer generated map.

31. The method of claim 29 further comprising the step of determining the speed and direction of movement of the mobile cellular radio.

* * * * *